United States Patent
Moser et al.

[11] Patent Number: 6,116,827
[45] Date of Patent: Sep. 12, 2000

[54] DRILLING TOOL

[75] Inventors: Bernhard Moser, Altshausen; Mathias Fuss, Weingarten, both of Germany

[73] Assignee: Hawera Probst GmbH, Germany

[21] Appl. No.: 09/152,513

[22] Filed: Sep. 14, 1998

[30] Foreign Application Priority Data

Sep. 13, 1997 [DE] Germany .............. 197 40 277

[51] Int. Cl.$^7$ .............. B23B 51/04; B23B 51/00
[52] U.S. Cl. .............. 408/204; 175/381; 175/385; 175/405; 408/206; 408/224; 408/226
[58] Field of Search .............. 175/381, 385, 175/389, 395, 405, 412, 415; 408/204, 206, 223, 224, 226, 231, 703, 713; 279/19

[56] References Cited

U.S. PATENT DOCUMENTS

| | | | |
|---|---|---|---|
| 1,746,455 | 2/1930 | Woodruff et al. | 175/381 |
| 3,647,310 | 3/1972 | Morse | 408/204 |
| 3,690,390 | 9/1972 | Chromy | 175/405 |
| 4,002,214 | 1/1977 | Schaumann | 175/405 |
| 5,171,111 | 12/1992 | Kishimoto | 408/204 |
| 5,775,445 | 7/1998 | Kleine | 175/385 |
| 5,788,430 | 8/1998 | Meyen et al. | 175/415 |

FOREIGN PATENT DOCUMENTS

| | | | |
|---|---|---|---|
| 0732164A1 | 9/1996 | European Pat. Off. | |
| 3842401 | 6/1990 | Germany | 408/204 |
| 201114 | 12/1982 | Japan | 408/204 |

Primary Examiner—Steven C. Bishop
Attorney, Agent, or Firm—Venable; George H. Spencer; Robert Kinberg

[57] ABSTRACT

A drilling tool, in particular for rotary percussion drilling preferably of rock, is proposed, with a drill body preferably equipped with cutting tips toward the drilling side and with an axially arranged bore for receiving an exchangeable center drill. In order to carry out easy mounting and demounting of the center drill, the drilling tool is designed in two parts, the center drill being capable of being introduced into the drilling tool on the clamping side.

12 Claims, 2 Drawing Sheets

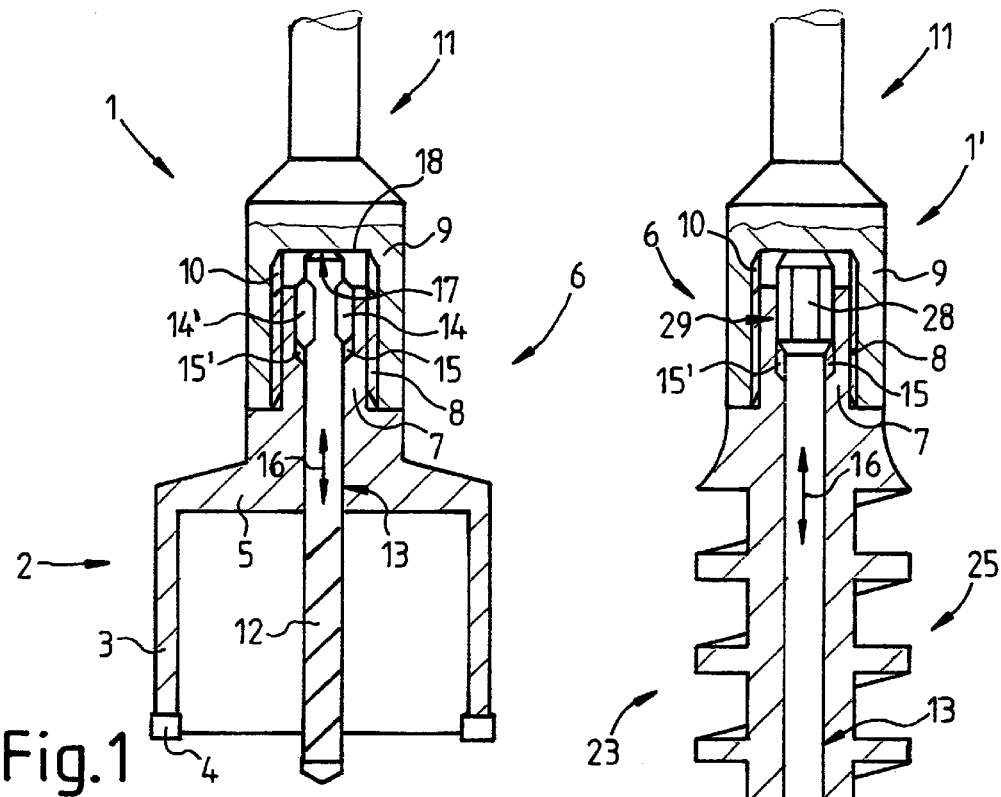
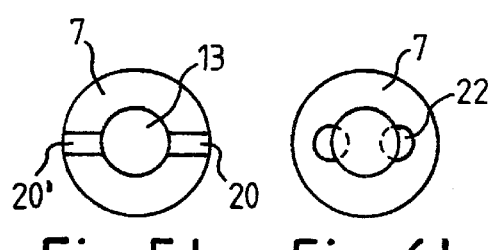
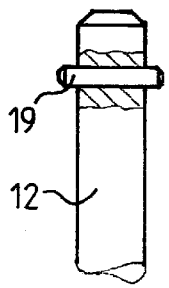
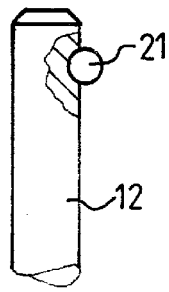
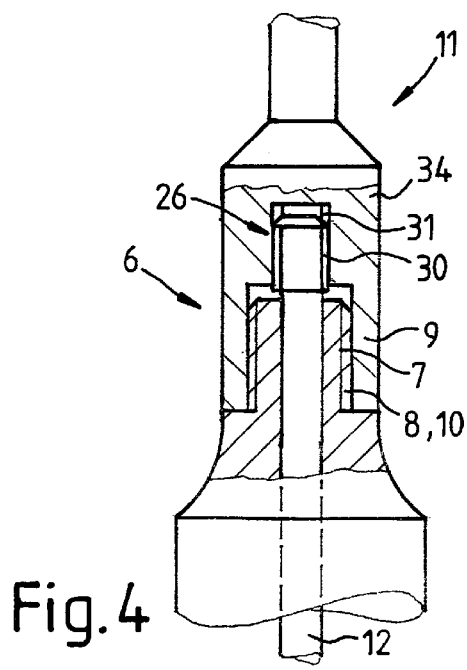

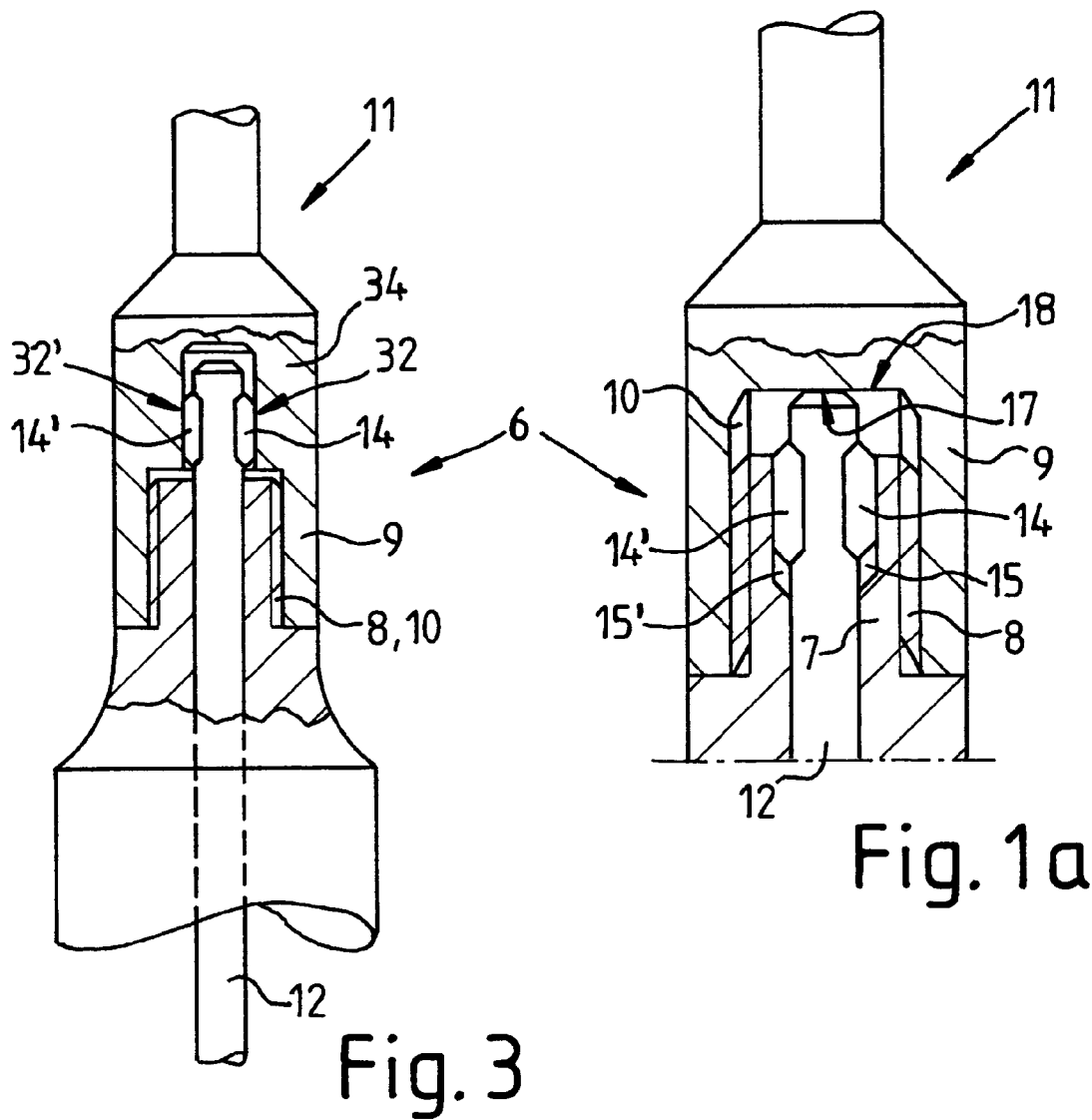
Fig. 3
Fig. 1a
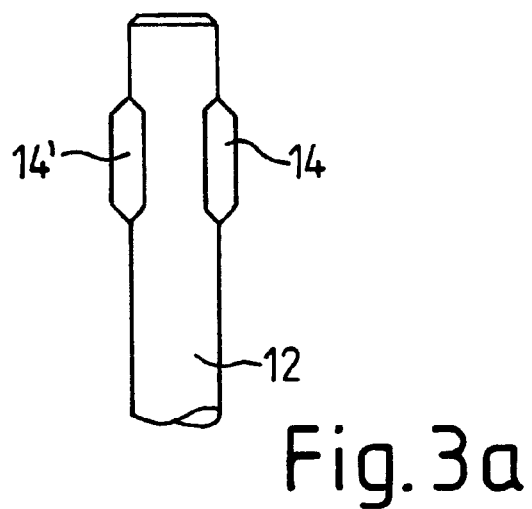
Fig. 3a

DRILLING TOOL

The invention relates to a drilling tool, in particular for the rotary percussion drilling of rock or concrete.

PRIOR ART

Drilling tools and, in particular, rock drills are used for making perforations in concrete or masonry and, in particular, are also designed for use in drill hammers.

EP 0,732,164 A1 describes a large number of known drilling tools as prior art, to which express reference is hereby made. In the case of both drill bits and socalled piercing drills, there is the problem of fixing the center drill firmly, but also exchangeably, in the drilling tool. In this regard, the literature reference mentioned gives a large number of possibilities of solution which contain sometimes complicated mechanisms in order to guarantee a secure connection of the center drill.

The disadvantage of all the known solutions and also of those described in EP 0,732,164 A1 is that they employ complicated devices, such as screws, rings, bolts, etc., in order to secure the center drill in a corresponding bore in the drill body. In this case, it is necessary, in part, to satisfy the requirement that the center drill should be longitudinally displaceable axially, in order to transmit hammer forces.

OBJECT AND ADVANTAGES OF THE INVENTION

The object on which the invention is based is to propose an extremely simple and robust method for receiving and fixing a center drill within a drilling tool. At the same time, if possible, additional aids for fixing and locking the center drill, which are largely releasable and may therefore be lost, are to be dispensed with.

Proceeding from a drilling tool according to the preamble of claim 1, this object is achieved by means of the defining features of claim 1. The subclaims specify advantageous and expedient developments of the drilling according to the invention.

The invention is based on the essential notion that a drilling tool, in particular for the rotary percussion drilling of rock, is advantageously provided with an exchangeable center drill which, in general, is designed as a wearing part. In this case, the center drill itself is to be mounted, preferably so as to be axially movable, within its receiving bore, so as to be subjected to percussion stress. This is not necessary, however, for nonpercussion use. In order to ensure that the center drill is securely fixed against falling out and, furthermore, that a reliable rotary takeup of the latter is achieved, the drilling tool is designed in two parts, a front drill body and a rear clamping end with a clamping shank for the drill body being provided. The parts are fixed to one another, for example, via a thread. When the drilling tool designed in two parts is separated, a bore may be provided at the separation point, and the center drill can be inserted through said bore counter to the usual pushin direction. In order that the cylindrical shank of the center drill does not fall through this central bore in the drill body, radial projections or widenings are made at the shank end of the center drill, said projections and widenings engaging into corresponding radial recesses in the drill body and consequently not only secure the center drill axially, but additionally cause a rotary takeup of the latter. By virtue of this simple measure, the center drill can be inserted into the drill body on the rear side or clamping side and be fixed securely in terms of rotation. Axial movability can nevertheless be guaranteed.

When the center drill has been inserted into the drill body on the clamping side, the clamping end with the clamping shank is screwed onto the external thread of the drill body. To that extent, it is also possible for the center drill to be exchanged in a very simple way.

In order to make a simple and yet very secure connection, the clamping shank of the center drill may have winglike radial widenings which, for example, are produced from the cylindrical clamping end of the center drill in a stamping process. These winglike widenings then engage positively into corresponding recesses in the drill body.

Polygonal profiles may also be used, which form a radial widening at the end of the clamping shank of the center drill, in order to secure the latter against falling through the bore. A further embodiment may provide a simple crosspin through the shank end of the center drill, said crosspin engaging into U-shaped open-ended depressions in the drill body on both sides of the receiving bore for the center drill.

In a development of the invention, open-ended pockets may also be provided in the drilling tool, into which pockets engage, for example, spherical takeup elements which are held in undercuts at the shank end of the center drill.

Finally, an end thread may be provided in the clamping end of the drilling tool as a further embodiment of the invention, said thread cooperating with a corresponding end thread at the end of the center drill. Another positive takeup may also be provided instead of the thread.

DRAWINGS

The drawings illustrate various exemplary embodiments of the invention. These are explained in more detail in the following description, giving further details and advantages of the invention.

In the drawings:

FIG. 1 shows a first exemplary embodiment of a drilling tool designed as a drill bit, with an inserted center drill, FIG. 1a shows an enlarged illustration of FIG. 1 in the region of the shank end, FIG. 2 shows a further exemplary embodiment of a center drill mounting in a solid drilling tool, with a conveying helix indicated, FIG. 3 shows a first alternative exemplary embodiment for fastening the center drill in the clamping end of the drilling tool, FIG. 3a shows the center drill end according to FIG. 3, FIG. 4 shows a second alternative exemplary embodiment for fastening the center drill in the clamping end of the drilling tool, FIGS. 5a and 5b show an alternative embodiment for fixing the center drill in the drill body, and FIGS. 6a and 6b show a further variant for fixing the center drill in the drill body.

DESCRIPTION OF THE EXEMPLARY EMBODIMENTS

The present invention can, in principle, be implemented on various drilling tools, as is illustrated by way of example in FIGS. 1 to 4. In particular, the mounting according to the invention of a center drill may take place both in a drill bit according to FIG. 1 and in a piercing drill according to FIG. 2.

FIG. 1 illustrates a first exemplary embodiment of a drilling tool 1 comprising a drill bit 2 which consists of a potlike housing 3 with carbide cutting tips 4 arranged on the end face. The bottom 5 of the drill bit 2 merges into a clamping end 6 designed in two parts. The drill body 2 designed as a drill bit therefore has, in its end region, a connecting cylinder 7 with an external thread 8. A hollow cylinder 9 with an internal thread 10 is screwed onto this connecting cylinder 7, so that the clamping end 6 together with the clamping shank 11 of he drilling tool is designed in two parts.

Since the drilling tool is designed in two parts in the region of its clamping end, a center drill 12 can be inserted through a central continuous bore 13 in the drill body 2 into the drill bit 2 from the direction of the clamping shank, that is to say on the clamping side, after the hollow cylinder 9 has been unscrewed.

So that a cylindrical center drill 12 does not simply fall through the adapted bore 13, two mutually opposite winglike radial projections 14, 14' are provided at the upper end of the center drill 12, said projections engaging positively into correspondingly adapted radial recesses 15, 15' in the connecting cylinder 7. The radial recesses 15, 15' are delimited toward the drilling side. This prevents the center drill 12 from falling through the bore 13. Furthermore, a reliable rotary takeup is guaranteed.

The center drill 12 may be embedded in the recesses 15, 15' of limited axial extent, in such a way that there is some axial play, as illustrated symbolically by the arrow 16. Percussive stress, which emanates from the bottom 18 of the hollow cylinder 9 serving as a clamping shank, can thereby be exerted on the end 17 of the center drill 12. However, the center drill 12 cannot fall out in the direction of advance.

Since the tool and tool shank are designed in two parts, therefore, a center drill capable of being fitted from the rear becomes possible, and the center drill can be designed with or without axial play. Due to the radial thickening or the radial projections at the end of the center drill, secure fixing in the axial direction and rotary takeup are possible.

Instead of winglike projections 14, 14' at the end of the center drill shank, other takeup elements may also be provided, which may be designed either in one part or in two parts. For example, FIGS. 5a and 5b show a crosspin 19 at the shank end of the center drill 12, said crosspin engaging positively in an open-ended slotlike recess 20, 20' on both sides of the bore 13 at the end of the connecting cylinder 7. Balls 21, rings or the like, which engage into corresponding open-ended pockets 22 on the connecting cylinder 7, may also be used as additional elements. For example, a ball 21 may then be inserted in the closed-ended longitudinal groove of a so-called SDS hammerdrill, said ball cooperating positively with a corresponding pocket 22. It is critical that the tool together with the shank is in two parts, with the result that the center drill can be fitted from the rear and fixed by means of holding elements.

The exemplary embodiment according to FIG. 2 shows a drilling tool 1' which is designed as a piercing drill 23 and which, once again, is designed in two parts. The drilling tool consists of a drill head 24 designed with carbide cutting elements 4, of an adjoining conveying helix 25 for drill dust and of an end-side clamping shank 11 to be received in a hammer drilling machine or the like. The clamping end 6, once again, is designed in two parts, with a connecting cylinder 7 and a hollow cylinder 9, as described with regard to FIGS. 1 and 1a. The two parts, once again, are connected to one another via an external thread 8 and an internal thread 10, respectively.

The drill body once again has a central passage bore 13 for receiving a center drill 12. In the exemplary embodiment according to FIG. 2, a hexagon 28 is provided at the shank end of the center drill 12, said hexagon forming a radial widening in relation to the diameter of the center drill 12, so as to be received in a corresponding insertion bore 29 in the connecting cylinder 7.

Here too, the center drill 12 can be fixed in the drilling tool with or without axial play (see the arrow 16). It may, once again, be subjected to percussion energy on its end face by the clamping shank 11.

The exemplary embodiment according to FIG. 3 shows a further alternative embodiment. Here, the center drill 12 is likewise provided, on the end face, with two mutually opposite winglike radial projections 14, 14' (see FIG. 3a) which engage into corresponding adapted radial recesses 32, 32' in the clamping shank 11. Corresponding recesses 32, 32' are therefore provided in the bottom part 34 of the hollow cylinder 9 both for the end of the center drill 12 and for the positive takeup elements 14, 14'.

The exemplary embodiment according to FIG. 4 shows a bottom part 34 in the clamping shank 11, a threaded fastening 26 with an internal thread 31 in the bottom part 34 and an external thread 30 at the center drill end. In this case, the connecting cylinder 7 does not have any additional radial recesses in order to fix the center drill 12.

Insofar as the tool according to the invention is in non-percussive use, the center drill may therefore also be mounted without any axial play.

The invention is not restricted to the exemplary embodiment illustrated and described. On the contrary, it also embraces all developments within the scope of the patent claims.

What is claimed is:

1. A drilling tool comprising:
   a center drill having a center drill shank, a clamping end, and at least one of radially extending projections and widenings on said center drill shank;
   a front drill body comprising a drilling side, a clamping side, and an axially arranged bore for receiving said center drill;
   a rear clamping end having a clamping shank; and
   means for at least one of securing and positioning the center drill provided in the drill body proximal to its clamping end,
   wherein the center drill is insertable into said axial bore from the clamping side of said front drill body; the front drill body and the rear clamping end are detachably and directly connectable; and the center drill is detachably connectable to at least one of said front drill body and said rear clamping end by means of radially extended recesses in at least one of said front drill body and said rear clamping end cooperating with the at least one of the radially extending projections and widenings on said center drill shank to effect a positive connection between said center drill and at least one of said front drill body and said rear clamping end.

2. The drilling tool as claimed in claim 1, wherein the radially extended recesses are provided in said front drill body said at least one of the radially extending projections and widenings cooperating with said radially extended recesses to effect a positive connection between said center drill and said front drill body.

3. The drilling tool as claimed in claim 1, wherein the front drill body is connected to the rear clamping end via a screw thread.

4. The drilling tool as claimed in claim 1, wherein the front drill body further comprises a connecting cylinder having an external threaded region and the rear clamping end further comprises a hollow cylinder having an internal threaded region, said hollow cylinder being engagable over said connecting cylinder.

5. The drilling tool as claimed in claim 1, wherein the radial extending recesses comprise at least one of winglike and polygonal recesses, said at least one of the widenings and projections cooperating positively with said at least one of winglike and polygonal recesses to effect a positive connection between said said center drill and at least one of said front drill body and said rear clamping end.

6. The drilling tool as claimed in claim 1, further comprising at least one radially extending transverse slot, into which a crosspin engages positively at the shank end of the center drill.

7. The drilling tool as claimed in claim 1, wherein the center drill is mounted in the drilling tool with axial longitudinal play.

8. The drilling tool as claimed in claim 1, wherein the at least one of the radial projections and widenings on the center drill comprise at least one separate component cooperating with the recesses.

9. The drilling tool as claimed in claim 1, wherein the rear clamping end further comprises an internal thread for receiving at least one of an end external thread of the center drill and positive receiving elements.

10. The drilling tool as claimed in claim 1, wherein a said front drill body is a potlike drill bit.

11. The drilling tool as claimed in claim 1, wherein the front drill body comprises a piercing drill with or without an outer conveying helix, and wherein said rear clamping end can be screwed onto the front drill body at the clamping end of said front drill body.

12. The drilling tool as claimed in claim 8, wherein the separate component is at least one of a pin, ball and ring.

* * * * *